Aug. 26, 1958 J. M. EASTMAN 2,848,870
FUEL FEED AND POWER CONTROL SYSTEM FOR GAS TURBINE ENGINES
Filed Sept. 22, 1955 2 Sheets-Sheet 1

INVENTOR.
JAMES M. EASTMAN
BY
ATTORNEY

Aug. 26, 1958  J. M. EASTMAN  2,848,870
FUEL FEED AND POWER CONTROL SYSTEM FOR GAS TURBINE ENGINES
Filed Sept. 22, 1955  2 Sheets-Sheet 2

INVENTOR.
JAMES M. EASTMAN
BY
Robert C. Smith
ATTORNEY

2,848,870

FUEL FEED AND POWER CONTROL SYSTEM FOR GAS TURBINE ENGINES

James Middleton Eastman, South Bend, Ind., assignor to Bendix Aviation Corporation, South Bend, Ind., a corporation of Delaware Application September 22, 1955, Serial No. 535,907

11 Claims. (Cl. 60—39.28)

This invention relates to control systems for gas turbine engines and more particularly to a control system for metering fuel to a twin-spool axial flow engine in such manner as to avoid the compressor stall region.

For several years the manufacturers of gas turbine engines and fuel controls for these engines have been plagued with a severe limitation on acceleration caused by compressor stall. Many types of fuel controls have been devised most of which contemplate, in one way or another, scheduling the flow of fuel to the engines in such manner as to avoid the compressor stall region. Another approach to the problem has been to build engines in which two compressors are used, each being permitted to rotate independently of the other. The main purpose of this so called "twin-spool" engine is to improve the stall characteristics of the composite compressor and this purpose is accomplished if the ratio of the speeds of the separate compressors do not vary beyond acceptable limits. For any given twin-spool engine having a fixed nozzle area, there is a fixed schedule of speed ratios with respect to the speed of either compressor for steady state operation. This schedule will be referred to as the steady state ratio. Some departure from the steady state ratio is unavoidable during acceleration. For this reason it has been determined that the well known fuel metering functions which have been used in controlling fuel to single spool engines may be inadequate and that any control function for twin-spool engines must take into consideration the speed ratio factor if fuel scheduling during acceleration is not to be unduly restricted. It is also desirable if this end can be accomplished without the necessity for using temperature sensing devices, which in the past have proved to be sources of trouble due to slow response and deterioration experienced from the very high temperatures to which they may be exposed. It is therefore an object of the present invention to devise a control which will enable the twin-spool engine with which it is associated to accelerate as rapidly as possible despite appreciable variations from the steady state ratio.

It is another object of the present invention to provide a fuel control for twin-spool gas turbine engines in which engine operating conditions reflecting the rotational speeds of the compressors are sensed and used to correct fuel flow to avoid the compressor stall area despite speed ratio variations.

It is a further object to provide a fuel control incorporating a fuel metering function which will provide the maximum accelerating fuel without exceeding compressor stall limits for all speed ratios encountered without the necessity of sensing engine operating temperatures.

It is a further object to provide a fuel control system for twin-spool engines which meters fuel to the engine as a function of a certain engine operating condition which defines a fuel flow which will avoid the compressor stall region for speed ratios equal to or below steady state; i. e. in accordance with the relation $W_f = P_R f_2(R_L)$ and as a function of other engine operating conditions for speed ratios exceeding the steady state ratio; i. e. in accordance with the relay $W_f = P_R\{f_2(r_L) - C[f_1(r_L) - r_T]\}$.

Other objects and advantages will become apparent from examination of the following specification taken in connection with the accompanying drawings in which.

Figure 1:
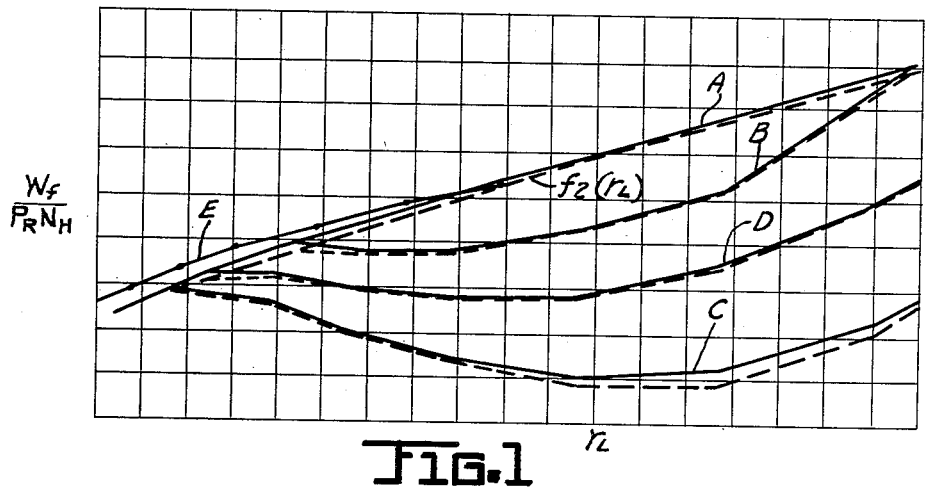
Figure 1 is a graph showing the manner in which my control meters fuel to follow the compressor stall conditions of a typical twin-spool engine under speed ratio variations.

Referring now to Figure 1, it will be observed that a series of curves have been drawn wherein the weight rate of fuel ($W_f$) supplied corrected for varying inlet pressure to the low pressure compressor ($P_R$) and rotational speed of the high pressure compressor ($N_H$) is plotted against pressure ratio across the low pressure compressor ($r_L$). These two compressors will be referred to hereafter as the L. P. compressor and H. P. compressor, respectively. The solid lines indicate the actual engine fuel at the point where the composite compressor can be said to be entering a surge or stall condition for various speed ratio conditions. The dashed lines show the fuel metered by my control for the equivalent conditions. It will be observed that the control meters very close to, but not exceeding, the stall limit established by the solid lines and would, therefore, allow the engine with which it is associated to accelerate at a rate very nearly approaching the maximum limit without danger of stalling. Curve A shows the fuel flow which would be required to run both compressors into stall simultaneously. There is a specific schedule of speed ratios which produces this condition. Curve B shows the fuel limits at steady state ratios where the L. P. compressor runs into stall. Curves C and D show the fuel limits where the L. P. compressor encounters stall at speed ratios ($N_L/N_H$) of ten percent and five percent respectively above the steady state speed ratios (lead). Curve E shows the fuel required to run the H. P. compressor into stall at speed ratios twenty percent below the steady state speed ratios (lag). It will be observed that curve E does not represent a serious limiting factor on the allowable fuel flow as do curves B, C and D. I have determined that a workable twin-spool control may meter along a line just short of curve A for the condition of common compressor stall and for all L. P. compressor speeds less than those corresponding to the speed ratios on the common stall line. A metering function closely approaching curve A has been found to be $W_f \propto P_R N_H f(r_L)$ where $W_f$ = Weight of fuel delivered.
$P_R$ = Pressure at inlet to L. P. compressor or ram pressure.
$N_H$ = H. P. compressor R. P. M.
$r_L$ = Pressure ratio across the L. P. compressor.

Therefore, if $W_f$ is proportional to $P_R N_H f(r_L)$, then $$\frac{W_f}{P_R N_H} = f(r_L)$$

It will be observed that this is the function plotted in Figure 1 and that $f_2(r_L)$ is the dashed line corresponding very closely to line A. My control meters along this line for all conditions where the speed ratios are below steady state (lag) and will in no case supply fuel in excess of this amount. Where speed ratios are above steady state a limiting factor must be introduced. The considerations from which this factor is developed are discussed below.

Figure 2:
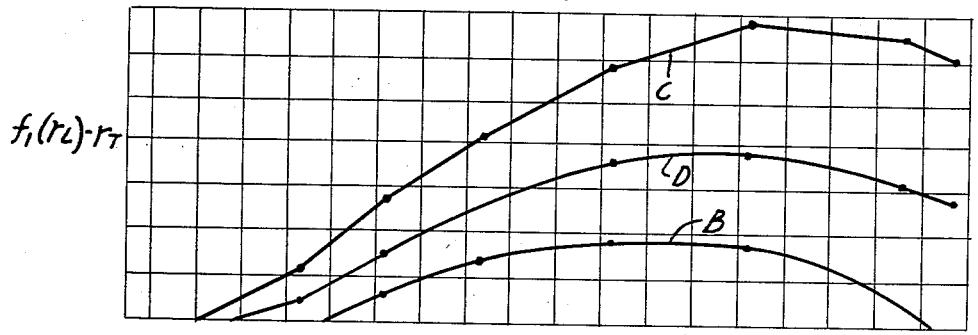
Figure 2 is a graph showing another engine characteristic pertinent to the theory of the subject control system to be described below.
Figure 3:
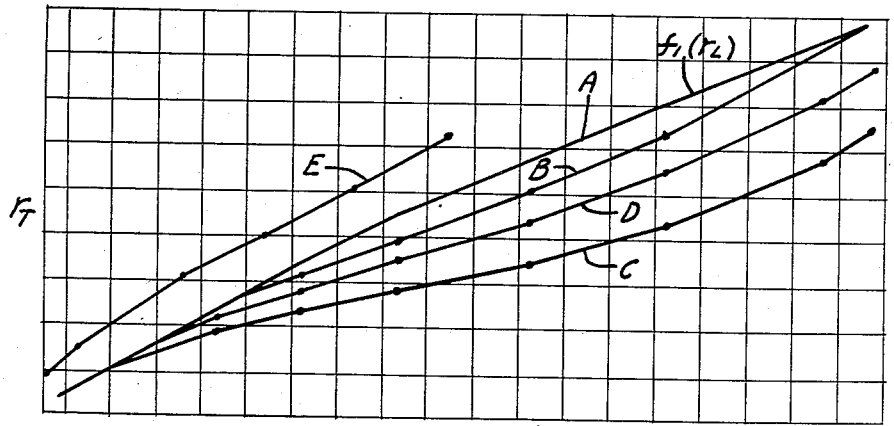
Figure 3 is a graph in which total pressure ratio ($r_T$) is plotted against low pressure compressor ratio ($r_L$).

Figure 3 contains a family of curves wherein total compressor pressure ratio or the ratio of the pressure sensed across both compressors ($r_T$) is plotted against L. P. compressor ratio ($r_L$). For the common stall line, a definite relation exists between $r_T$ and $r_L$ at all points and this relationship appears on Figure 3 as line A. This line will be considered to define a function $f_1(r_L)$. Curves A, B, C, D and E arise out of the same operating conditions, respectively, as are considered in the description of Figure 1. It will be seen that when lead is developed relative to the common surge line, $r_T$ becomes less generally for the same value of $r_L$. To provide for conditions where this relative lead is developed, the differences shown in the curves of Figure 3 are plotted as separate curves in Figure 2 wherein the horizontal axis is $r_L$ as for Figure 3. The curves of Figure 2, then, are indicative of the fuel flow reduction from the line $f_2(r_L)$ of Figure 1 necessary to compensate for conditions of L. P. compressor lead. By selecting the proper proportionality constant (in this case .425), the control function lines may be made to equal or be slightly less than the desired flow lines for all speed ratio conditions with a minimum of accelerating fuel sacrifice. The mechanical arrangement of the control is such that this lead correction is applied only when $r_T$ is less than $f_1(r_L)$. Figure 1 shows that a minor penalty is imposed by this control philosophy when $r_T$ is greater than $f_1(r_L)$, as indicated by the difference between curve E and curve A.

From the foregoing, it will be appreciated that the desired fuel control system must meter fuel so as to accelerate according to the equation $$W_f = C_1 P_R N_H f_2(r_L)$$

when $f_1(r_L)$ is less than $r_L$ (lag) and according to the equation $$W_f = C_1 P_R N_H \{f_2(r_L) - C_2[f_1(r_L) - r_T]\}$$

when $f_1(r_L)$ is greater than $r_T$ (lead). The specific predetermined functions $f_1$ and $f_2$ differ from engine to engine and are experimentally determined. They normally take the form of a characteristic plotted as a curve or graph and are not usually susceptible of the exact mathematical expression. In hydromechanical control systems, these functions are normally incorporated as a contour ground on a cam or on a valve.

Figure 4:
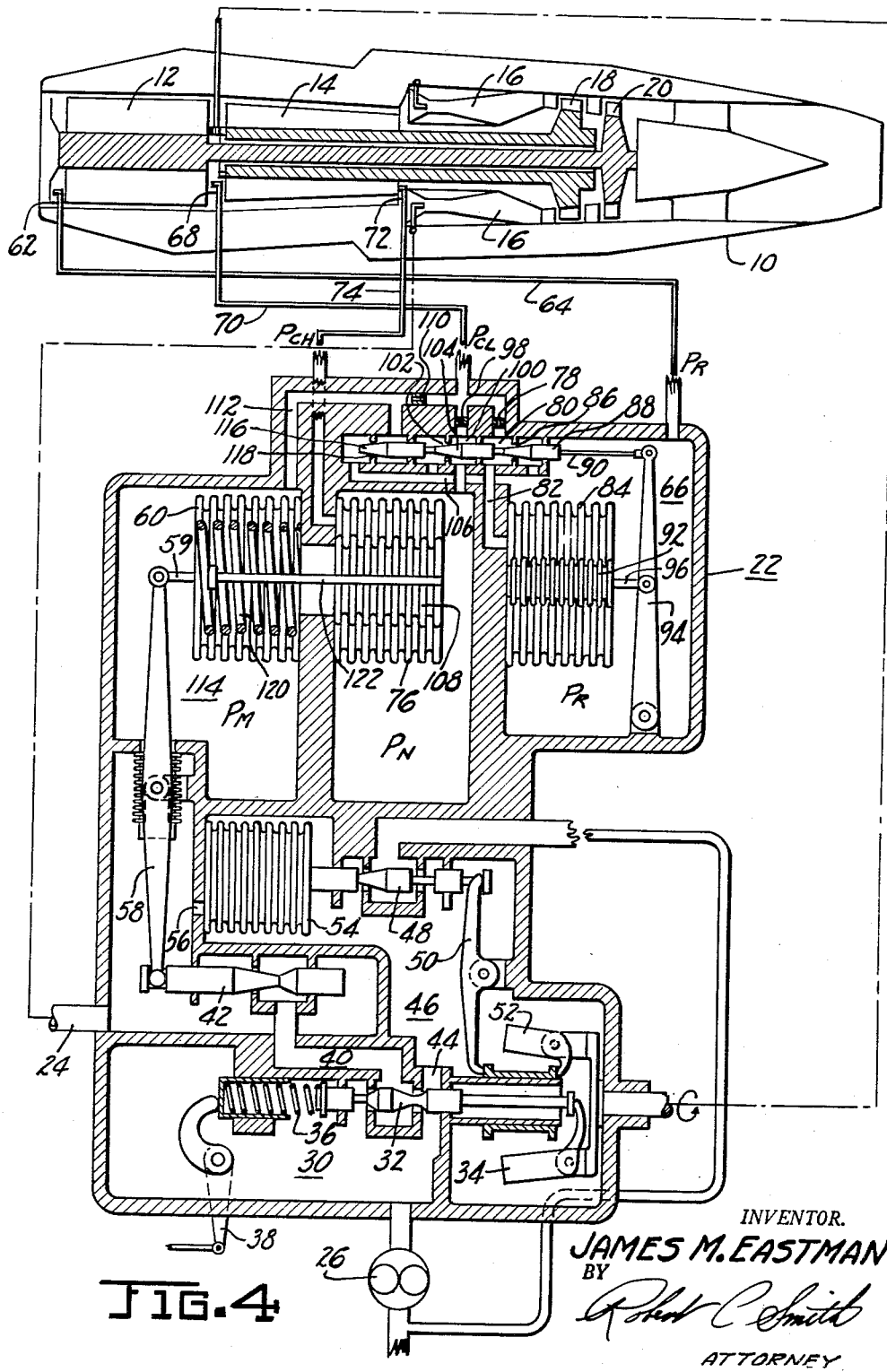
Figure 4 is a schematic diagram of a control incorporating my invention.

Referring now to Figure 4, numeral 10 represents a twin-spool axial flow engine having an L. P. compressor 12, an H. P. compressor 14, burners 16, a high pressure turbine 18, and a low pressure turbine 20. Fuel is supplied to the burners 16 through the action of a metering unit shown generally at numeral 22 which has a discharge pipe 24 communicating with nozzles in said burners. Fuel is supplied to unit 22 from a source (not shown) through the action of a pump 26. Fuel from pump 26 is supplied to a chamber 30. Fluid passage from this chamber is controlled by a double valve 32, the axial position of which is established through the action of a flyweight mechanism 34 driven by the engine (H. P. compressor) which exerts a force opposite to that established by a spring 36 operably connected to a linkage 38 the position of which is established by the pilot or operator. The position of valve 32, then, is established by balancing the request (force exerted by spring 36) against the speed signal (force exerted by flyweight structure 34). The main flow of metered fuel then enters a passage 40 leading to a second valve 42 in series with valve 32, the position of which is established through means to be discussed hereafter. Additional fuel from chamber 30 goes through a passage 44 into a chamber 46. Flow from this chamber, which is by-passed back to the source, is controlled through the action of a valve 48 which is attached at one end to a lever 50 positioned by means of a flyweight structure 52 responsive to $N_H$ and on the other end to a bellows 54, the interior of which communicates through a port 56 with metered fuel pressure on the downstream side of valve 42. Valve 48, then, controls the head across both of valves 32 and 42 in proportion to the square of the rotational speed of the H. P. compressor, by-passing excess fuel back to the inlet of pump 26. With the head across valves 32 and 42 held proportional to the square of H. P. compressor rotational speed, the flow through these valves varies directly with this speed. During acceleration, the governor valve 32 assumes a wide open position so that the head reflecting $N_H$ is primarily effective across valve 42. This valve is contoured to cause flow to vary in direct proportion to its travel when valve 32 is open and the head across both is held constant. When the requested speed is reached, the governor valve 32 then moves in a closing direction, overriding the action of valve 42.

Pressure and pressure ratio effects are introduced through movement of the valve 42. This valve is actuated by a lever 58 attached through a shaft 59 to a bellows 60. Pressures are sensed at various positions within engine 10, the L. P. compressor inlet or ram pressure ($P_R$) by means of a sensor 62 which is connected through a conduit 64 with a chamber 66, the L. P. compressor discharge pressure ($P_{CL}$) by means of a sensor 68 connected through a conduit 70 to a series of channels within metering unit 22, and H. P. compressor discharge pressure ($P_{CH}$) by means of a sensor 72 communicating through a passageway 74 with the interior of a bellows 76.

Referring more specifically to the fluid pressure system with which conduit 70 communicates, the L. P. compressor discharge pressure ($P_{CL}$) is supplied to a fixed restriction 78 of area $A_1$. This restriction communicates with a chamber 80 having a lower pressure $P_X$ which is connected through a conduit 82 with the inside of a bellows 84. A second orifice 86 is in series with orifice 78, the area $A_2$ of said second orifice being variable through the action of a valve member 88 attached to a shaft 90. It will be observed that the downstream side of valve 88 communicates with chamber 66 and the ram pressure ($P_R$). Bellows 84 is thereby subjected to pressure $P_R$ on the outside and to the intermediate pressure $P_X$ over a smaller area on the inside. Concentrically positioned within bellows 84 is an evacuated bellows 92. A lever 94 is pinned to the bottom of chamber 66 and is attached to a shaft 96 connected to bellows 84 and also to one end of shaft 90. In this manner pressure differentials across bellows 84 and which result in movement of bellows 84 are transmitted to shaft 90 and its associated valve.

Another path in parallel with that described above is through fixed orifice 98 into a chamber 100, through a variable orifice 102 the area of which is varied by means of a valve 104 attached to shaft 90, to a channel 106 which communicates with ram pressure $P_R$ in chamber 66. The pressure in chamber 100 is an intermediate pressure $P_N$ which is that acting against the outside of bellows 76. Inside of bellows 76, the H. P. compressor discharge pressure ($P_{CH}$) acts against a smaller area than does $P_N$. Concentrically positioned within bellows 76 is a bellows 108 which is evacuated.

A third parallel path traces pressure ($P_{CL}$) from conduit 70, through a fixed restriction 110, through a channel 112 to a chamber 114 in which an additional intermediate pressure $P_M$ is maintained through the action of a valve 116 which varies the area of an orifice 118. The chamber downstream of valve 118 communicates through channel 106 with chamber 66 and pressure $P_R$. The bellows 60 is evacuated on the inside but has a tension spring 120 working in opposition to the pressure $P_M$. The evacuated interior of bellows 60 communicates directly with the interior of bellows 108. Attached to the right end of bellows 76 is a shaft 122 having a stop on the end thereof which limits the travel of bellows 60 toward the right.

To understand the purpose and operation of the fluid pressure system shown herein it will be convenient to refer to the subject matter disclosed in copending application S. N. 386,362, filed October 15, 1953, in the name of Robert G. Rose (common assignee). In that application it is established that if two restrictions of areas $A_1$ and $A_2$ are placed in series in a conduit which is vented at one end to a source of variable high fluid pressure ($P_{CL}$) and at the opposite end to a source of variable low pressure ($P_R$), control of the ratio of fluid pressures across the second series restriction $$\frac{P_X}{P_R}$$

to a substantially constant value results in the ratio of the areas $$\frac{A_2}{A_1}$$

being equal to and variable only as a predetermined function of the ratio of the source pressures $$\left(\frac{P_{CL}}{P_R}=r_L\right)$$

This relationship may be expressed in the following form:

$$\frac{A_2}{A_1}=f(r_L)$$

when $$\frac{P_X}{P_R}$$

equals a constant and where $f$ denotes a predetermined functional relation.

This relationship has been utilized in the design of the fluid pressure system incorporated in metering unit 22 so that the degree of displacement of the shaft 90 and the valve member 88 connected thereto relative to the areas $A_1$ and $A_2$ of orifices 78 and 86 is always a predetermined function of the L. P. compressor pressure ratio $r_L$, which function may be varied as desired by suitable contouring of the valve 88. The pressure ratio $P_M/P_R$ across orifice 118 is a characteristic function of $r_L$ and the ratios of the areas of orifices 110 and 118. By contouring the valve 116 the ratio of said areas may be made such a function of $$\frac{P_{CH}}{P_R}$$

as to make the resulting ratio $P_M/P_R$ be almost any desired function $f_2(r_L)$, or, $P_M=P_R f_2(r_L)$. A similar line of reasoning shows $P_N=P_R f_1(r_L)$. These functions are determined by the contours of valve members 104 and 116. By arranging bellows as shown and selecting effective areas for the desired forces, the leftward force on bellows 76 is made proportional to $P_R f_1(r_L)-P_{CH}$. Since the discharge pressure of the H. P. compressor is equal to the ram pressure times the total compressor pressure ratio ($P_{CH}=P_R r_T$); the force is then proportional to $P_R[f_1(r_L)-r_T]$. This force pushes to the left when $f_1(r_L)$ is greater than $r_T$ (indicating a lead condition), becomes zero when $f_1(r_L=)r_T$ (at the condition where both compressors are at their surge lines), or pushes to the right when $r_T$ is greater than $f_1(r_L)$ (indicating a lag condition). At this time it will be noted that member 122 is moving away from the left wall of bellows 60 and therefore cannot effect lever 58 or valve 42. During a lead condition, member 122 will contact the left wall of bellows 60 thereby introducing the forces existing on bellows 76. The net force on bellows 60 and the travel of valve 42 is then proportional to $P_M-C(P_N)$ which equals $P_R\{f_2(r_L)-C[f_1(r_L)-r_T]\}$. For other conditions it is $P_R f_2(r_L)$.

While only a single embodiment is shown herein it will be understood that changes may be made to suit requirements of a particular application without departing from the scope of the invention.

I claim:

1. In a fuel control system for a gas turbine engine having a burner, a low pressure compressor and a high pressure compressor drivably connected to separate turbines and rotated independently of one another, a conduit for supplying fuel to said burner, valve means for varying the effective area of said conduit, and means for controlling the flow through said valve means during transient engine operating conditions comprising means responsive to high pressure compressor speed for varying the pressure drop across said valve means and means for varying the travel of said valve means including a first chamber, a bellows in said chamber the exterior of which is in communication through a conduit having a restriction therein with low pressure compressor discharge pressure and having in the evacuated interior thereof a resilient member urging said bellows toward its direction of maximum extension, a linkage system operably connecting said bellows with said valve means, a second chamber, a second bellows in said second chamber the exterior of said bellows being in communication through a conduit having a restriction therein with low pressure compressor discharge pressure, a third bellows positioned within said second bellows the space between said second and third bellows communicating with high pressure compressor discharge pressure, the interior of said third bellows being in communication with the interior of said first bellows, a shaft attached to the common end of said second and third bellows in such manner as to exert a force tending to urge said first bellows in its direction of maximum extension when the distance between the ends of said bellows reaches a predetermined minimum, a third chamber communicating with low pressure compressor inlet pressure and through a conduit having a fixed restriction and a variable restriction with low pressure compressor discharge pressure, a fourth bellows in said chamber having its hollow interior communicating through a fixed restriction with low pressure compressor discharge pressure, an evacuated bellows concentrically positioned within said fourth bellows, a shaft and a valve member mounted on said shaft, and a lever attached to said shaft and to said fourth bellows in such manner as to transmit movement of said bellows to said shaft to thereby vary the area of said variable restriction.

2. A fuel control system as set forth in claim 1 wherein said valve member is so contoured that its linear displacement is always a predetermined function of the low pressure compressor ratio.

3. In a fuel control system for a gas turbine engine having a burner, a low pressure compressor and a high pressure compressor drivably connected to separate turbines and rotated independently of one another, a conduit for supplying fuel to said burner, valve means for varying the effective area of said conduit, and means for controlling the flow through said valve means during transient engine operating conditions comprising means responsive to high pressure compressor speed for varying the pressure drop across said valve means and means for varying the travel of said valve means including a first pressure responsive means exposed to a pressure variable with low pressure compressor discharge pressure and to an oppositely directed force exerted by a resilient means, a linkage system operably connecting said first pressure responsive means with said valve means, a second pressure responsive means exposed to a pressure variable with low pressure compressor discharge pressure and to an oppositely directed force variable with high pressure compressor discharge pressure, means associated with said second pressure responsive means for exerting a force against said first pressure responsive means effective to move said valve means in a closing direction under pressure conditions reflecting leading of the low pressure compressor with respect to the steady state ratio, a third pressure responsive means exposed to a pressure variable with low pressure compressor inlet pressure, and to an oppositely directed force variable with low pressure compressor discharge pressure, and means connected to said third pressure responsive means operable to establish the position of each of said first and second pressure responsive means as predetermined functions of low pressure compressor ratio.

4. In a fuel control system for a gas turbine engine having a burner, a low pressure compressor and a high pressure compressor drivably connected to separate turbines and rotated independently of one another, a conduit for supplying fuel to said burner, valve means for varying the effective area of said conduit, and means for controlling the flow through said valve means during transient engine operating conditions comprising means responsive to high pressure compressor speed for varying the pressure drop across said valve means and means for varying the travel of said valve means such that it is proportional to $P_R f_2(R_L)$ for compressor speed ratios equal to or below the steady state ratio and proportional to $P_R\{f_2(r_L) - C[f_1(r_L) - r_T]\}$ for compressor speed ratios above the steady state ratio where $P_R$ denotes compressor inlet pressure, $r_L$ denotes the pressure ratio across the low pressure compressor, $r_T$ represents the total pressure ratio across both the high and low pressure compressors, C represents a constant and $f_1$ and $f_2$ represents specific predetermined functions.

5. In a fuel control system for a gas turbine engine having a burner, a low pressure compressor and a high pressure compressor drivably connected to separate turbines and rotated independently of one another and a conduit for supplying fuel to said burner: valve means for controlling the amount of fuel flowing through said conduit during transient engine operating conditions and means for varying the travel of said valve means such that it is proportional to $P_R f_2(r_L)$ for compressor speed ratios equal to or below the steady state ratio and proportional to $P_R\{f_2(r_L) - C[f_1(r_L) - r_T]\}$ for compressor speed ratios above the steady state ratio where $P_R$ denotes compressor inlet pressure, $r_L$ denotes the pressure ratio across the low pressure compressor, $r_T$ represents the total pressure ratio across both the high and low pressure compressors, C represents a constant and $f_1$ and $f_2$ represent specific predetermined functions.

6. In a fuel control system for a gas turbine engine having a burner, a low pressure compressor and a high pressure compressor drivably connected to separate turbines and rotated independently of one another, a conduit for supplying fuel to said burner, valve means for varying the effective area of said conduit, and means for controlling the flow through said valve means during transient engine operating conditions comprising means responsive to high pressure compressor speed for varying the pressure drop across said valve means and pressure responsive means for varying the travel of said valve means including means reflecting changes in ram pressure, low pressure compressor discharge pressure and high pressure compressor discharge pressures such that said travel is proportional to $P_R f_2(r_L)$ for compressor speed ratios equal to or below the steady state ratio and proportional to $P_R\{f_2(r_L) - C[f_1(r_L) - r_T]\}$ for compressor speed ratios above the steady state ratio where $P_R$ denotes compressor inlet pressure, $r_L$ denotes the pressure ratio across the low pressure compressor, $r_T$ represents the total pressure ratio across both the high and low pressure compressors, C represents a constant and $f_1$ and $f_2$ represent specific predetermined functions.

7. A fuel system for a gas turbine engine having a low pressure compressor and a high pressure compressor drivably connected to separate turbines and rotated independently of one another, a burner, a conduit for supplying fuel to said burner, valve means for varying the effective area of said conduit, speed responsive means for varying the head across said valve means, and means reflecting changes in compressor inlet pressure, low pressure compressor discharge pressure and high pressure compressor discharge pressure effective to vary the travel of said valve means with changes in low pressure compressor ratio when compressor speed ratios are equal to or below the steady state ratio, and with low pressure compressor ratio and the total compressor pressure ratio when compressor speed ratios are higher than the steady state ratio.

8. A fuel system for a gas turbine engine having a low pressure compressor and a high pressure compressor drivably connected to separate turbines and rotated independently of one another, a burner, a conduit for supplying fuel to said burner, valve means for varying the effective area of said conduit, speed responsive means for varying the head across said valve means, and means variable with low pressure compressor ratio effective to vary the travel of said valve means when compressor speed ratios are equal to or below the steady state ratio and variable with low pressure compressor ratio and total compressor pressure ratio when compressor speed ratios are higher than the steady state ratio.

9. A fuel system for a gas turbine engine having a low pressure compressor and a high pressure compressor drivably connected to separate turbines and rotated independently of one another, a burner, a conduit for supplying fuel to said burner, and means for controlling the flow through said conduit including means variable with low pressure compressor ratio effective to control fuel flow when compressor speed ratios are equal to or below the steady state ratio and variable with low pressure compressor ratio and the total compressor pressure ratio effective to control fuel flow when compressor speed ratios are higher than the steady state ratio.

10. A fuel system for a gas turbine engine having a low pressure compressor and a high pressure compressor drivably connected to separate turbines and rotated independently of one another, a burner, a conduit for supplying fuel to said burner, and means for controlling the flow through said conduit including means variable with low pressure compressor ratio effective to control fuel flow when compressor speed ratios are equal to or below the steady state ratio and variable with other engine operating conditions when compressor speed ratios are higher than the steady state ratio such that the quantity of fuel supplied to said engine may be less and never exceeds that supplied at steady state ratios.

11. A fuel system for a gas turbine engine having a low pressure compressor and a high pressure compressor drivably connected to separate turbines and rotated independently of one another, a burner, a conduit for supplying fuel to said burner, and means for controlling the flow of fuel through said conduit including means reflecting changes in low pressure compressor inlet pressure, low pressure compressor discharge pressure, and high pressure compressor discharge pressure effective to vary fuel flow with changes in low pressure compressor ratio when compressor speed ratios are equal to or below the steady state ratio and with low pressure compressor ratio and the total compressor pressure ratio when compressor speed ratios are higher than the steady state ratio.

References Cited in the file of this patent

UNITED STATES PATENTS

| | | |
|---|---|---|
| 2,458,600 | Imbert et al. | Jan. 11, 1949 |
| 2,738,644 | Alford | Mar. 20, 1956 |

UNITED STATES PATENT OFFICE
CERTIFICATE OF CORRECTION

Patent No. 2,848,870                                                   August 26, 1958

James Middleton Eastman

It is hereby certified that error appears in the printed specification of the above numbered patent requiring correction and that the said Letters Patent should read as corrected below.

Column 2, line 1, for "relay" read -- relation --.

Signed and sealed this 17th day of February 1959.

(SEAL)
Attest:
KARL H. AXLINE
Attesting Officer

ROBERT C. WATSON
                                                              Commissioner of Patents